(12) United States Patent
Koellisch et al.

(10) Patent No.: US 6,766,712 B2
(45) Date of Patent: *Jul. 27, 2004

(54) STEERING COLUMN

(75) Inventors: David Koellisch, Lafayette, IN (US); Gregory B. Livengood, Greenfield, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/991,424

(22) Filed: Nov. 21, 2001

(65) Prior Publication Data

US 2003/0094060 A1 May 22, 2003

(51) Int. Cl.[7] ................................. B62D 1/18
(52) U.S. Cl. ........................... 74/493; 280/775
(58) Field of Search ................. 74/493, 492, 494, 74/495, 516, 517, 518; 280/775

(56) References Cited

U.S. PATENT DOCUMENTS

| | | | | |
|---|---|---|---|---|
| 3,504,569 A | * | 4/1970 | Zoltok | 74/493 |
| 3,718,053 A | * | 2/1973 | Cinadr | 74/493 |
| 4,307,626 A | * | 12/1981 | Sanada et al. | 74/493 |
| 4,449,419 A | | 5/1984 | Bruguera | 74/493 |
| 4,554,843 A | | 11/1985 | Anderson | 74/493 |
| 4,656,888 A | | 4/1987 | Schmitz | 74/493 |
| 5,131,287 A | | 7/1992 | Stromberg | 74/493 |
| 5,259,264 A | | 11/1993 | Bodin et al. | 74/493 |
| 5,363,716 A | | 11/1994 | Budzik et al. | 74/493 |
| 5,626,059 A | * | 5/1997 | Bobbitt et al. | 74/493 |
| 6,357,317 B1 | * | 3/2002 | Livengood et al. | 74/493 |
| 2002/0020245 A1 | * | 2/2002 | Gaukel | 74/493 |

* cited by examiner

*Primary Examiner*—David A. Rucci
*Assistant Examiner*—Bradley J. Van Pelt
(74) *Attorney, Agent, or Firm*—Tarolli, Sundheim, Covell & Tummino L.L.P.

(57) ABSTRACT

A steering column (10) includes a mounting bracket (66) connecting the steering column (10) to a vehicle frame. A support (24), through which a steering column member (12) extends, is connected with the mounting bracket (66). The support (24) supports the steering column member (12) for rotation about and is movable relative to the mounting bracket. A locking mechanism (130) locks the support (24) in any one of a plurality of positions relative to the mounting bracket (66). The locking mechanism (130) has a locking lever (132) with first and second ends (171 and 136). A spring (194) applies a force to the first end (171) of the lever (132) to urge the second end (136) of the lever to clamp the support (24) to the mounting bracket (66). The first end (171) of the lever (132) moves against the force applied by the spring (194) to permit movement of the support (24) relative to the mounting bracket (66).

7 Claims, 3 Drawing Sheets

STEERING COLUMN

FIELD OF THE INVENTION

The present invention relates to an adjustable steering column, and more specifically, to a locking mechanism for an adjustable steering column.

BACKGROUND OF THE INVENTION

A known steering column is disclosed in U.S. Pat. No. 5,259,264. U.S. Pat. No. 5,259,264 discloses an adjustable steering column having a locking mechanism. The locking mechanism includes a spring device on a shaft between packages of plates. Levers are located between the spring device and the packages of plates. The spring device urges first ends of the levers away from each other to lock the steering column in position. A cable pulls second ends of the levers toward each other to permit adjustment of the steering column.

SUMMARY OF THE INVENTION

A steering column of the present invention includes a steering column member connectable with a steering wheel and rotatable to turn steerable vehicle wheels. A mounting bracket connects the steering column to a vehicle frame. A support, through which the steering column member extends, is connected with the mounting bracket. The support supports the steering column member for rotation about a longitudinal axis of the steering column member. The support is movable relative to the mounting bracket.

A locking mechanism locks the support in any one of a plurality of positions relative to the mounting bracket. The locking mechanism has a locking lever with first and second ends. A spring applies a force to the first end of the lever to urge the second end of the lever to clamp the support to the mounting bracket. The first end of the lever is movable against the force applied by the spring to permit movement of the support relative to the mounting bracket.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
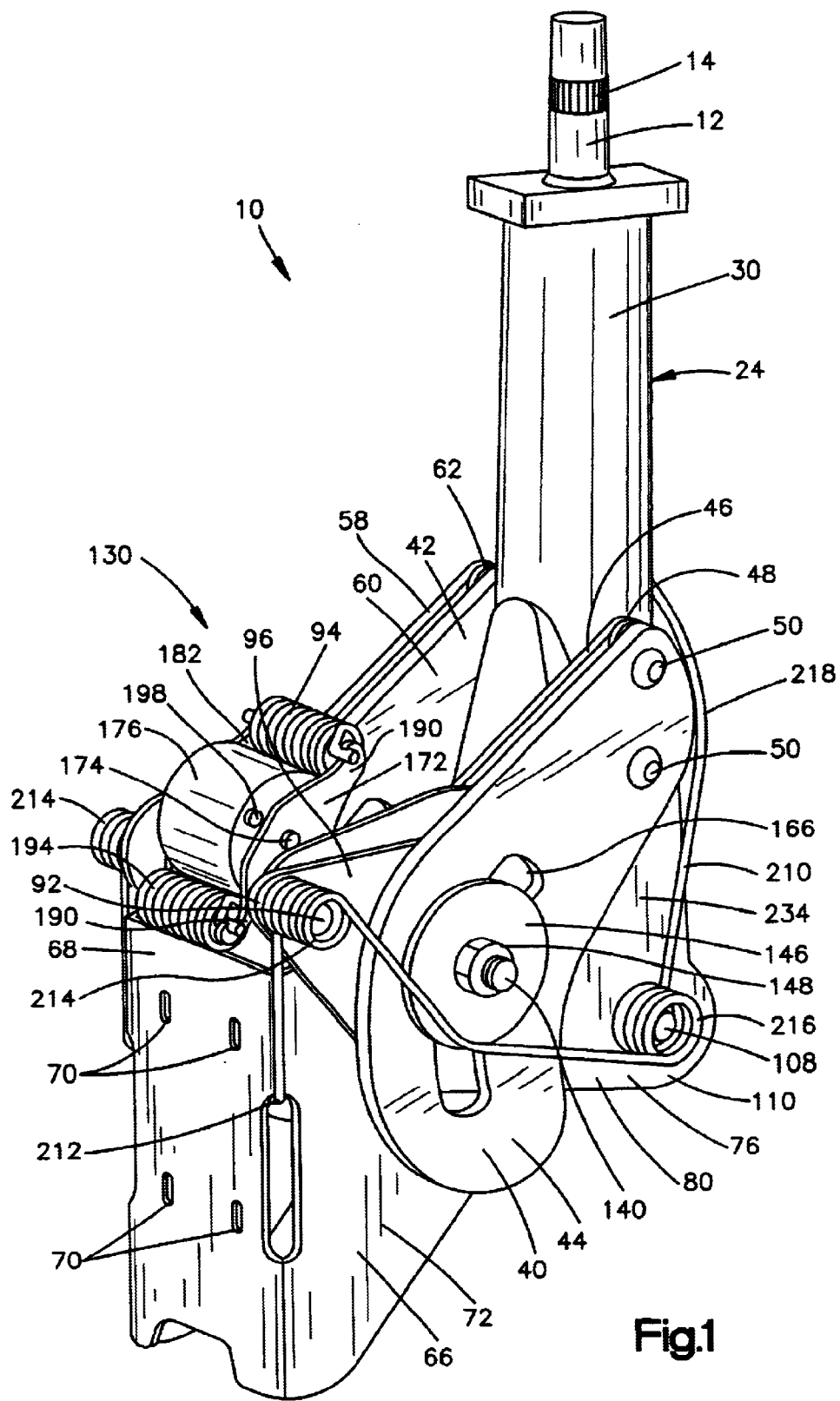
FIG. 1 is a schematic pictorial view of a steering column constructed in accordance with the present invention.
Figure 2:
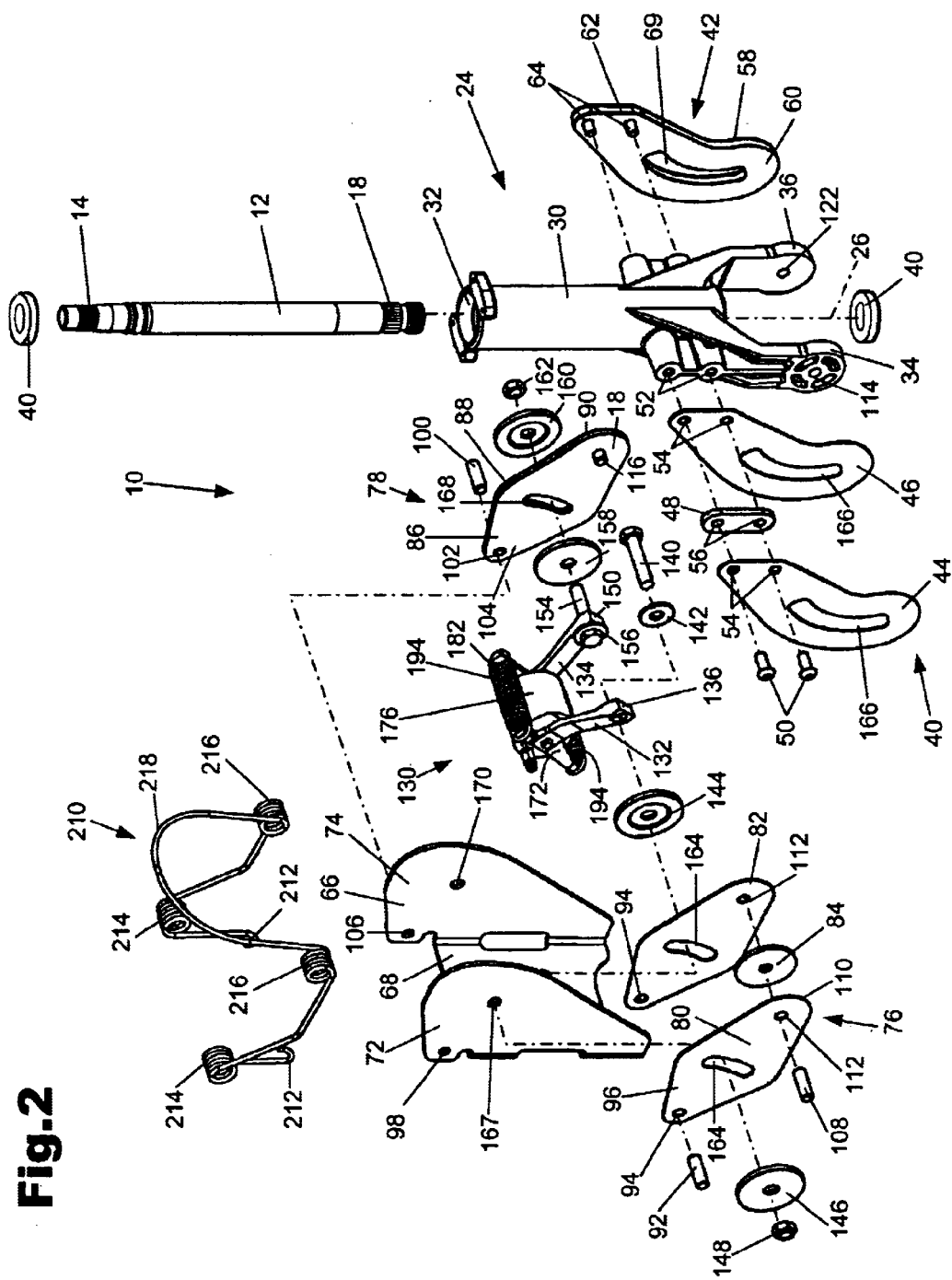
FIG. 2 is an exploded view of the steering column of FIG. 1.

A vehicle steering column 10 constructed according to the present invention is illustrated in FIGS. 1 and 2. The steering column 10 includes a rotatable steering column member 12 to turn steerable vehicle wheels (not shown). The steering column member 12 has an end 14 connectable with a steering wheel (not shown) in manner known in the art.

An end 18 (FIG. 2) of the steering column member 12 opposite from the end 14 is connectable with a universal joint (not shown). The universal joint connected with the end 18 of the steering column member 12 is connectable with a mechanism designed to transmit movement of the steering column member to a steering gear and permit movement of the steering column member relative to the mechanism, as known in the art.

A support 24 supports the steering column member 12 for rotation about a longitudinal axis 26 of the steering column member. Upon rotation of the steering wheel, the steering column member 12 rotates about the longitudinal axis 26. Upon rotation of the steering column member 12 about the longitudinal axis 26, steerable vehicle wheels (not shown) are turned, as known in the art.

The support 24 has a tubular portion 30 with a passage 32 through which the steering column member 12 extends. Arm portions 34 and 36 extend from the tubular portion 30. The tubular portion 30 is made by casting and may have any desired shape. Bearings 40 located in the passage 32 support the steering column member 12 for rotation relative to the support 24.

The support 24 includes locking portions 40 and 42 extending axially from opposite sides of the tubular portion 30. The locking portion 40 includes plates 44 and 46 fixedly connected to each other with a spacer 48 between them. The locking portion 40 is fixedly connected to the tubular potion 30 by fasteners 50, such as screws. The fasteners 50 threadably engage openings 52 in the tubular portion 30 and extend through openings 54 in the plates 44 and 46 and through openings 56 in the spacer 48.

The locking portion 42 is identical to locking portion 40 and, therefore, will not be described in detail. The locking portion 42 includes plates 58 and 60 fixedly connected to each other with a spacer 62 between them. The locking portion 42 is fixedly connected to the tubular potion 30 by fasteners 64, such as screws. The fasteners 64 threadably engage openings in the tubular portion 30 and extend through openings in the plates 58 and 60 and through openings in the spacer 62.

A mounting bracket 66 connects the steering column 10 with a vehicle frame. The mounting bracket 66 has a rear wall 68 with openings 70 for receiving fasteners to connect the mounting bracket to the vehicle frame. The mounting bracket 66 is connected to the vehicle frame using fasteners (not shown), such as bolts, as known in the art.

A pair of side walls 72 and 74 extend from the rear wall 68 of the mounting bracket 66. The side walls 72 and 74 extend generally perpendicular to the rear wall 68 and parallel to each other. A pair of identical arms 76 and 78 interconnect the support 24 and the mounting bracket 66. The arm 76 includes a pair of plates 80 and 82 fixedly connected together with a washer 84 between them. The side wall 72 of the mounting bracket 66 also extends between the plates 80 and 82. The arm 78 includes a pair of plates 86 and 88 fixedly connected together with a washer 90 between them. The side wall 74 of the mounting bracket 66 also extends between the plates 86 and 88.

A pin 92 extends through openings 94 in an end 96 of the arm 76. The pin 92 is received in an opening 98 in the side wall 72 to pivotally connect the arm 76 to the side wall 72. A pin 100 extends through openings 102 in an end 104 of the arm 78. The pin 100 is received in an opening 106 in the side wall 74 to pivotally connect the arm 78 to the side wall 74. Accordingly, the arms 76 and 78 can pivot relative to the mounting bracket 66.

A pin 108 (FIGS. 1 and 2) pivotally connects an end 110 of the arm 76 to the support 24. The pin 108 extends through openings 112 in the end 110 and the washer 84 and into an opening 114 in the arm portion 34 of the support 24. A pin 116 pivotally connects an end 118 of the arm 78 with the arm portion 36 of the support 24. The pin 116 extends through openings in the end 118 and the washer 90 and into an opening 122 in the support 24. Accordingly, the support 24 can pivot relative to the arms 76 and 78.

A locking mechanism 130 (FIGS. 1 and 2) locks the arms 76 and 78 in any one of a plurality of pivot positions relative to the mounting bracket 66. The locking mechanism 130 also locks the support 24 in any one of a plurality of pivot positions relative to the arms 76 and 78. The locking mechanism 130 applies a force to clamp the arm 76 and the side wall 72 of the mounting bracket 66 between the plates 44 and 46 of the locking portion 40 of the support 24. The locking mechanism 130 also clamps the arm 78 and the side wall 74 of the mounting bracket 66 between the plates 58 and 60 of the locking portion 42 of the support 24.

Figure 3:
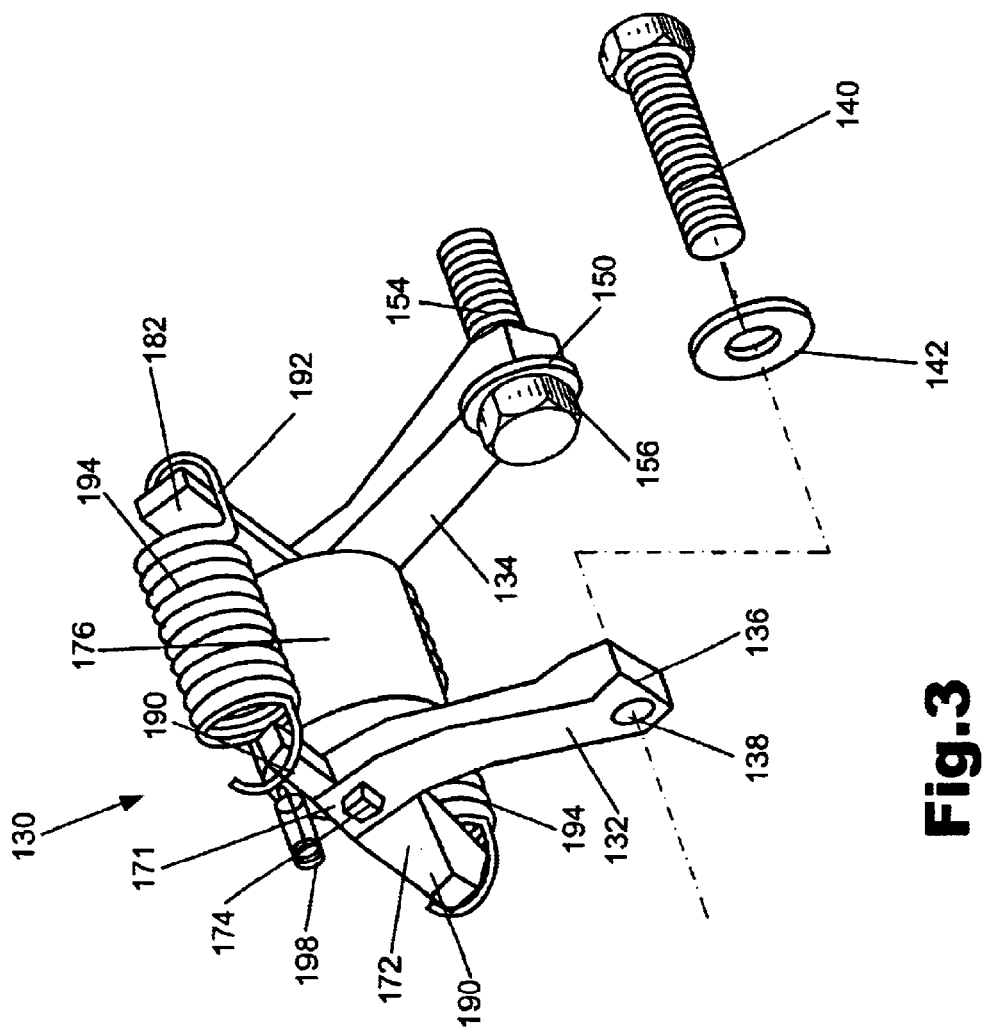
FIG. 3 is an enlarged view of a locking mechanism of the steering column of FIG. 1.

The locking mechanism 130 (FIGS. 2 and 3) includes locking levers 132 and 134 that apply a force to the plates 46 and 60 of the locking portions 40 and 42 of the support 24 to prevent movement of the support 24 relative to the mounting bracket 66. The locking lever 132 (FIG. 3) has an end 136 with an opening 138 through which a locking shaft or bolt 140 extends. The bolt 140 (FIG. 2) also extends through washers 142, 144 and 146. The washer 144 is located between the end 136 and the plate 46 of the support 24. A nut 148 threadably engages the bolt 140 and presses the washer 146 against the plate 44 of the support 24. The locking lever 134 (FIG. 3) has an end 150 with an opening through which a locking shaft or bolt 154 extends. The bolt 154 (FIG. 2) also extends through washers 156, 158 and 160. The washer 158 is located between the end 150 and the plate 60 of the support 24. A nut 162 threadably engages the bolt 154 and presses the washer 160 against the plate 58 of the support 24.

The locking shaft 140 (FIG. 2) extends through arcuate slots 164 in the arm 76 and arcuate slots 166 in the locking portion 40 of the support 24. The arcuate slots 164 in the arm 76 are located between the ends 96 and 110 of the arm 76. The locking shaft 140 also extends through opening 167 in the side wall 72 of the mounting bracket 66. The locking shaft 154 extends through arcuate slots 168 in the arm 78 and arcuate slots 169 in the locking portion 42 of the support 24. The arcuate slots 168 in the arm 78 are located between the ends 104 and 118 of the arm 78. The locking shaft 154 also extends through opening 170 in the side wall 74 of the mounting bracket 66.

The locking lever 132 (FIG. 3) has an end 171 connected with a cross member 172 and a piston 174 extending into a cylinder 176. The locking lever 134 has an end (not shown) opposite from the end 150 connected with a cross member 182 and the cylinder 176. The cross member 172 has opposite ends 190 and the cross member 182 has opposite ends 192. Coil springs 194 extend between the ends 190 and 192 of the cross members 172 and 182. The springs 194 apply a force to pull the end 171 of the locking lever 132 toward the end of the locking lever 134 opposite from the end 150 to move the ends 136 and 150 away from each other. Accordingly, the ends 136 and 150 of the locking levers 132 and 134 apply force to the plates 46 and 60 of the locking portions 40 and 42 to clamp the arms 76 and 78 and the side walls 72 and 74 between the plates 44, 46 and plates 58, 60 of the support 24.

The cylinder 176 has a port 198 for receiving a pressurized fluid, such as air. The pressurized fluid moves the piston 174 and the cylinder 176 relative to each other against the force of the springs 194. Accordingly, when the pressurized fluid is applied to the piston 174, the force applied by the springs 194 is released and the steering column 12 can be positioned relative to the mounting bracket 66.

A spring member 210 (FIGS. 1 and 2) urges the support 24 to pivot in a counter-clockwise direction, as viewed in FIGS. 1 and 2, relative to the arms 76 and 78 and the arms to pivot in a counter-clockwise direction relative to the mounting bracket 66. The spring member 210 (FIG. 2) has ends 212 that engage the mounting bracket 66 to connect the spring member to the mounting bracket. Coiled portions 214 of the spring member extend around and engage the pins 92 and 100. Coiled portions 216 extend around and engage the pins 108 and 116. A curved portion 218 of the spring member 210 extends between the coiled portions 216 and engages the support 24. The spring member 210 urges the steering column 10 into an out of the way position. Although the spring member 210 is shown as having coiled portions 214 and 216 and curved portion 218, it is contemplated that any mechanism may be used to urge the steering column 10 to the out of the way position. It is also contemplated that the steering column 10 may not be urged to the out of the way position.

When pressurized fluid is applied to the cylinder 176, the end 171 of the locking lever 132 and the end of the locking lever 134 opposite the end 150 are moved away from each other and the ends 136 and 150 are moved toward each other. When the ends 136 and 150 are moved toward each other, the support 24 may be pivoted relative to the arms 76 and 78 and the arms may be pivoted relative to the mounting bracket 66.

The arms 76 and 78 move relative to the bolts 140 and 154 and the mounting bracket 66. The locking portions 40 and 42 of the support 24 also move relative to the bolts 140 and 154 and the mounting bracket 66. The bolts 140 and 154 are engageable with opposite ends of the arcuate slots 164, 168 in the arms 76 and 78 and with opposite ends of the arcuate slots 166, 169 in the locking portions 40 and 42 of the support 24 to limit movement of the support and arms relative to the mounting bracket 66. After the support 24 is positioned relative to the mounting bracket 66, the pressurized fluid is released from the cylinder 176. When the pressurized fluid is released from the cylinder 176, the end 171 of the locking lever 132 and the end of the locking lever 134 opposite the end 150 move toward each other and the ends 136 and 150 to move away from each other. As the ends 136 and 150 move away from each other, the arms 76 and 78 and the side walls 72 and 74 are clamped between the plates 44, 46 and plates 58, 60 of the locking portions 40 and 42 of the support 24. The arms 76 and 78 and the side walls 72 and 74 are clamped to prevent movement of the support 24 relative to the mounting bracket 66.

From the above description of the invention, those skilled in the art will perceive improvements, changes and modifications. Such improvements, changes and modifications within the skill of the art are intended to be covered by the appended claims.

Having described the invention, the following is claimed:

1. A steering column comprising:

a steering column member connectable with a steering wheel and rotatable to turn steerable vehicle wheels;

a mounting bracket which connects said steering column to a vehicle frame;

a support connected with said mounting bracket and through which said steering column member extends, said support supporting said steering column member for rotation about a longitudinal axis of said steering column member and being movable relative to said mounting bracket; and a locking mechanism which locks said support in any one of a plurality of positions relative to said mounting bracket, said locking mechanism having a locking lever with first and second ends and a spring applying a force to said first end of said lever to urge said second end of said lever to directly clamp said support to said mounting bracket, said first end of said lever being movable against the force applied by said spring to permit movement of said support relative to said mounting bracket.

2. A steering column as defined in claim 1 further including a piston movable within a cylinder, one of said piston and said cylinder being connected with said first end of said lever to move said first end of said lever against the force applied by said spring.

3. A steering column as defined in claim 1 further including a second locking lever having first and second ends, said spring applying force to said first end of said second locking lever to urge said second end of said locking lever to directly clamp said support to said mounting bracket, said first end of said second lever being movable against the force applied by said spring to permit movement of said support relative to said mounting bracket.

4. A steering column as defined in claim 3 wherein said spring urges said second end of said first locking lever away from said second end of said second locking lever to clamp said support to said mounting bracket, said second end of said first locking lever being movable toward said second end of said second locking lever to permit movement of said support relative to said mounting bracket.

5. A steering column as defined in claim 4 further including a piston movable within a cylinder, said piston being connected with said first end of said first locking lever and said cylinder being connected with said first end of said second locking lever to move said second end of said first locking lever toward said second end of said second locking lever.

6. A steering column as defined in claim 5 further including a first member connected with said first end of said first locking lever and extending transverse to said first locking lever and a second member connected with said first end of said second locking lever and extending transverse to said second locking lever, said spring engaging said first and second members to urge said first ends of said first and second locking levers to ward each other.

7. A steering column as defined in claim 6 further including a second spring, said first spring engaging a first end of said first member and a first end of said second member, said second spring engaging a second end of said first member and a second end of said second member.

* * * * *